(12) United States Patent
Takeda et al.

(10) Patent No.: US 11,575,487 B2
(45) Date of Patent: Feb. 7, 2023

(54) USER EQUIPMENT, RADIO BASE STATION, AND WIRELESS COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/752,935

(22) PCT Filed: Aug. 12, 2016

(86) PCT No.: PCT/JP2016/073798
§ 371 (c)(1),
(2) Date: Feb. 15, 2018

(87) PCT Pub. No.: WO2017/033780
PCT Pub. Date: Mar. 2, 2017

(65) Prior Publication Data
US 2018/0241530 A1    Aug. 23, 2018

(30) Foreign Application Priority Data
Aug. 21, 2015   (JP) .............................. JP2015-164186

(51) Int. Cl.
*H04L 5/00*        (2006.01)
*H04W 28/04*       (2009.01)
(Continued)

(52) U.S. Cl.
CPC .......... *H04L 5/0055* (2013.01); *H04L 1/1657* (2013.01); *H04L 1/1854* (2013.01);
(Continued)

(58) Field of Classification Search
CPC .............. H04W 72/1294; H04W 28/04; H04L 5/0055; H04L 1/1657
(Continued)

(56) References Cited

U.S. PATENT DOCUMENTS 8,614,978 B2   12/2013   Che et al.
9,344,999 B2   5/2016    Lee et al.
(Continued)

FOREIGN PATENT DOCUMENTS

EP    2104263 A1    9/2009
JP    2012-517164 A  7/2012
(Continued)

OTHER PUBLICATIONS

International Search Report issued in PCT/JP2016/073798 dated Oct. 25, 2016 (2 pages).
(Continued)

*Primary Examiner* — Christopher M Crutchfield
*Assistant Examiner* — Jean F Voltaire
(74) *Attorney, Agent, or Firm* — Osha Bergman Watanabe & Burton LLP

(57) ABSTRACT

This invention aims to appropriately transmit HARQ-ACK in future wireless communication systems. A user equipment includes a reception unit which receives a DL signal, and a control unit which controls transmission of a delivery acknowledgement signal for the DL signal, wherein the reception unit receives information concerning an instruction to transmit the delivery acknowledgement signal and the control unit controls transmission of the delivery acknowledgement signal on the basis of the information concerning the instruction to transmit the delivery acknowledgement signal. The reception unit of the user equipment
(Continued)

further receives downlink control information including the information concerning the instruction to transmit the delivery acknowledgement signal.

6 Claims, 11 Drawing Sheets

(51) Int. Cl.
    *H04W 72/04* (2009.01)
    *H04W 72/12* (2009.01)
    *H04L 1/18* (2006.01)
    *H04L 1/16* (2006.01)

(52) U.S. Cl.
    CPC .......... *H04L 1/1864* (2013.01); *H04L 1/1896* (2013.01); *H04W 28/04* (2013.01); *H04W 72/04* (2013.01); *H04W 72/12* (2013.01); *H04W 72/1294* (2013.01)

(58) Field of Classification Search
    USPC ........................................................ 370/329
    See application file for complete search history.

(56) References Cited

U.S. PATENT DOCUMENTS

| | | | | |
|---|---|---|---|---|
| 9,807,747 | B2* | 10/2017 | Hsieh | H04L 5/0053 |
| 9,826,544 | B2 | 11/2017 | Guo et al. | |
| 2009/0196249 | A1* | 8/2009 | Kawamura | H04B 1/7143 370/330 |
| 2009/0245190 | A1* | 10/2009 | Higuchi | H04L 47/10 370/329 |
| 2011/0053585 | A1* | 3/2011 | Otonari | H04W 72/085 455/422.1 |
| 2012/0033587 | A1* | 2/2012 | Papasakellariou | H04L 1/1671 370/277 |
| 2012/0113827 | A1* | 5/2012 | Yamada | H04L 1/1861 370/252 |
| 2013/0223300 | A1 | 8/2013 | Yang et al. | |
| 2013/0336160 | A1* | 12/2013 | Yin | H04L 1/1854 370/254 |
| 2014/0092790 | A1* | 4/2014 | Zhang | H04L 5/0053 370/280 |
| 2014/0126491 | A1* | 5/2014 | Ekpenyong | H04L 5/0055 370/329 |
| 2014/0321406 | A1* | 10/2014 | Marinier | H04B 7/024 370/329 |
| 2015/0110017 | A1 | 4/2015 | Park et al. | |
| 2015/0195072 | A1 | 7/2015 | Seo et al. | |
| 2016/0128028 | A1* | 5/2016 | Mallik | H04W 72/042 370/336 |
| 2016/0173394 | A1* | 6/2016 | Harvell | H04L 47/25 709/203 |
| 2017/0238287 | A1* | 8/2017 | Kusashima | H04W 28/04 370/280 |
| 2020/0083980 | A1* | 3/2020 | Papasakellariou | H04W 52/34 |

FOREIGN PATENT DOCUMENTS

| | | |
|---|---|---|
| JP | 2014-501078 A | 1/2014 |
| WO | 2014/049169 A1 | 4/2014 |
| WO | 2014/116164 A1 | 7/2014 |

OTHER PUBLICATIONS

Written Opinion of the International Searching Authority issued in PCT/JP2016/073798 dated Oct. 25, 2016 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in counterpart European Patent Application No. 16839127.4, dated Mar. 14, 2019 (7 pages).
Notice of Reasons for Refusal issued in Japanese Application No. 2017-536754, dated Jun. 30, 2020 (8 pages).
3GPP TSG-RAN WG1 Meeting #76; R1-140235; "Remaining HARQ details for TDD eIMTA;" MediaTek Inc.; Feb. 10-14, 2014; Prague, Czech Republic (4 pages).
Office Action in counterpart European Patent Application No. 16 839 127.4 dated Mar. 5, 2021 (4 pages).
Office Action issued in the counterpart Japanese Patent Application No. 2017-536754, dated Dec. 8, 2020 (8 pages).
NTT Docomo; "Discussion on multiple-step DCI for NR"; 3GPP TSG RAN WG1 Meeting #87, R1-1612717; Reno, USA; Nov. 14-18, 2016 (3 pages).

* cited by examiner

USER EQUIPMENT, RADIO BASE STATION, AND WIRELESS COMMUNICATION METHOD

TECHNICAL FIELD

The present invention relates to a user equipment, a radio base station, and a wireless communication method for next-generation mobile communication systems.

BACKGROUND ART

In UMTS (Universal Mobile Telecommunications System) networks, LTE (Long Term Evolution) has been specified to achieve, e.g., higher data rates and lower delays (non-patent literature 1). To achieve broader bands and higher speeds than LTE, LTE-Advanced (Rel. 10-12) has been specified, and a successor system of LTE called, e.g., 5G (5th generation mobile communication systems) or FRA (Future Radio Access) is now under study.

Future wireless communication systems (e.g., 5G) are expected to involve not only further increases in speed and capacity for mobile broadband applications but also, e.g., delay reduction and handling of connection from a large number of devices. In addition, for further increases in speed and capacity, broader frequency spectra are expected to be used.

In existing LTE systems (LTE Rel. 8-12), HARQ (Hybrid Automatic Repeat reQuest) is supported to lessen degradation in communication quality resulting from signal reception errors in wireless communication between a user equipment (UE) and a radio base station (eNB). In HARQ, the user equipment (or the radio base station) feeds back a delivery acknowledgement signal (HARQ-ACK) associated with data in accordance with the reception result of the data, and the radio base station (or the user equipment) controls data retransmission on the basis of the fed back HARQ-ACK.

Since the use of HARQ can effectively lessen degradation in communication quality of wireless communication between a user equipment and a radio base station, HARQ is expected to be supported even in future wireless communication systems.

CITATIONS LIST

Non-Patent Literature

Non-patent literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future wireless communication systems such as 5G are expected to perform communication in high frequency bands such as several tens of gigahertz and relatively low-volume data communication such as IoT (Internet of Things), MTC (Machine Type Communication), or M2M (Machine To Machine). In this manner, various communication conditions may be needed to the future wireless communication systems according to the communication environments. In such future wireless communication systems, when HARQ-ACK control (HARQ-ACK mechanism) in the existing LTE systems is directly used, it is probable that the sufficient communication service may not be provided.

The present invention has been made in consideration of the above-described issue, and has as one object to provide a user equipment, a radio base station, and a wireless communication method which can appropriately transmit HARQ-ACK in future wireless communication systems.

Solution to Problem

An aspect of a user equipment according to the present invention includes a reception unit which receives a DL signal, and a control unit which controls transmission of a delivery acknowledgement signal for the DL signal, wherein the reception unit receives information concerning an instruction to transmit the delivery acknowledgement signal and the control unit controls transmission of the delivery acknowledgement signal on the basis of the information concerning the instruction to transmit the delivery acknowledgement signal.

Advantageous Effects of Invention

According to the present invention, HARQ-ACK can be appropriately transmitted in future wireless communication systems.

DESCRIPTION OF EMBODIMENTS

In existing LTE systems (Rel. 12 or earlier), HARQ (Hybrid Automatic Repeat reQuest) is supported to lessen degradation in quality of communication between a user equipment (UE) and a radio base station (eNB). For example, the user equipment feeds back a delivery acknowledgement signal (to be also referred to as HARQ-ACK, ACK/NACK, or A/N hereinafter) on the basis of the reception result of a DL signal/DL channel transmitted from the radio base station. The radio base station controls retransmission or new data transmission on the basis of the delivery acknowledgement signal transmitted from the user equipment (DL HARQ). The radio base station further feeds back a delivery acknowledgement signal on the basis of the reception result of a UL signal/UL channel transmitted from the user equipment. The user equipment controls retransmission or new data transmission on the basis of the delivery acknowledgement signal and/or a UL transmission instruction transmitted from the radio base station (UL HARQ).

Figure 1A:
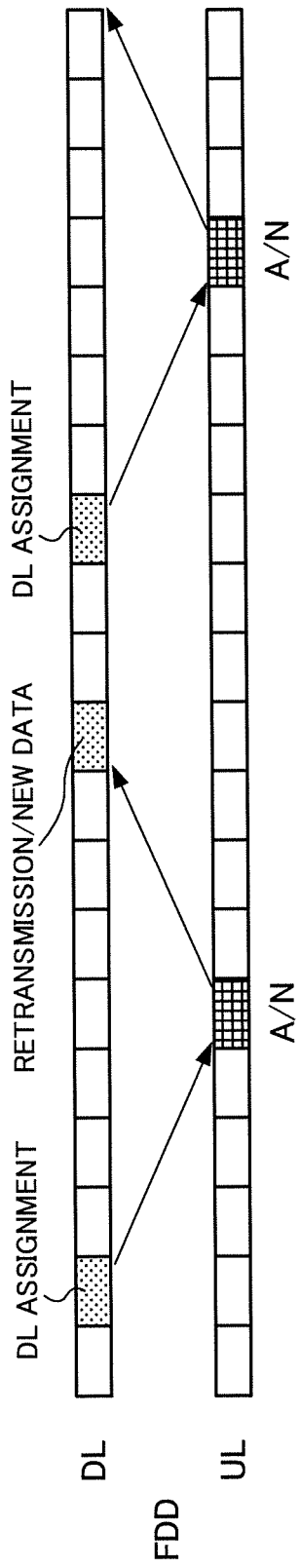
FIGS. 1A and 1B are diagrams illustrating an exemplary method for transmitting HARQ-ACK in existing LTE systems (Rel. 8-12).

In the existing LTE systems, since the TTI of UL transmission and DL transmission is set to 1 ms (1 subframe), the HARQ-ACK feedback timing is also controlled in units of subframes. In DL HARQ, a user equipment which uses FDD feeds back HARQ-ACK to the radio base station in a UL subframe 4 ms after a subframe in which a DL signal/DL channel (e.g., a PDSCH) is received (see FIG. 1A). Upon receiving the HARQ-ACK from the user equipment, the radio base station transmits data to be retransmitted or new data in a DL subframe that is 4 ms or later on the basis of the HARQ-ACK result.

Figure 1B:
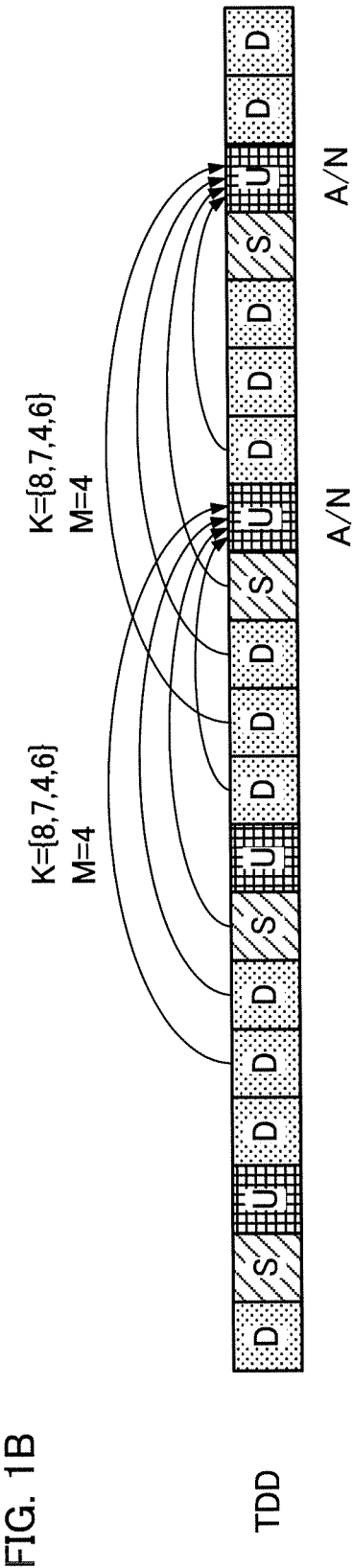

A user equipment which uses TDD feeds back HARQ-ACK in a predetermined UL subframe (a UL subframe that is 4 ms or later) defined for each UL/DL configuration from a subframe in which a PDSCH is received (see FIG. 1B). Upon receiving the HARQ-ACK from the user equipment, the radio base station transmits data to be retransmitted or new data in a predetermined DL subframe (a DL subframe that is 4 ms or later) defined for each UL/DL configuration on the basis of the HARQ-ACK result. Referring to FIG. 1B, four DL subframes (including a special subframe) are defined (M=4) in correspondence with a single UL subframe, and ACK/NACK for DL signals transmitted in the four DL subframes is fed back in the single UL subframe.

As described above, in the existing LTE systems, the HARQ-ACK feedback timing is defined as a subframe (FDD) 4 ms after signal reception in units of subframes or a predetermined subframe (TDD) at or later than 4 ms. The radio base station and/or the user equipment performs retransmission control based on a predetermined HARQ RTT (Round Trip Time) for signal transmission and reception. The RTT is the time taken from when a signal or data is transmitted to a communication party until a response is received. In the existing systems, the minimum time from when HARQ-ACK feedback is received until retransmission is performed is similarly defined. For example, the radio base station is defined to perform retransmission in a predetermined subframe by setting 4 ms after reception of ACK/NACK fed back from the user equipment as a minimum time.

In this manner, the processing operations can be simplified and the like by strictly defining the HARQ-ACK transmission timing between the radio base station and the user equipment and controlling HARQ-ACK transmission. When the HARQ-ACK transmission timing is defined as a fixed one, HARQ-ACK transmission may not be flexibly operated. For example, when the HARQ-ACK transmission timing is defined as a fixed one, the HARQ-ACK transmission timing limits the speedup (delay reduction) even in services or operations capable of high-speed processing. In addition, since HARQ-ACK is finely transmitted in units of subframes, the UL overhead may be high in the entire system. In future wireless communication systems, service provision in various aspects (use purpose) is assumed, and it is considered that appropriate communication conditions may be preferred according to the communication environments.

In view of this, the inventors of the present invention hit on the idea of introducing an instruction to transmit HARQ-ACK and controlling HARQ-ACK transmission on the basis of the instruction to transmit the HARQ-ACK. For example, the user equipment can control HARQ-ACK transmission (e.g., the transmission timing) for DL transmission on the basis of information concerning an instruction to transmit HARQ-ACK transmitted from the radio base station. The instruction to transmit HARQ-ACK may also be referred to as an HARQ-ACK transmission instruction, an HARQ-ACK transmission grant, an HARQ-ACK grant, an A/N transmission grant, or an A/N grant.

In this manner, controlling HARQ-ACK transmission on the basis of an instruction to transmit HARQ-ACK allows flexible control of HARQ-ACK transmission in services or operations capable of high-speed processing. Since the user equipment may not involve HARQ-ACK transmission using a UL resource (e.g., an uplink control channel) which is different for each subframe in which DL transmission is performed, the UL overhead can be kept less in the entire system.

The present embodiment will be described in detail below. In the following embodiment, an existing PUCCH format (e.g., PUCCH format 3) or a new PUCCH format having a capacity higher than that of PUCCH format 3 can be used as HARQ-ACK feedback. Although FDD will be taken as an example hereinafter, the same applies to TDD.

The following description assumes that the TTI (Transmission Time Interval) of UL transmission and/or DL transmission is set to 1 ms (1 subframe), as in the existing LTE systems, the present embodiment is not limited to this. The embodiment is also applicable to the case where, for example, a TTI (e.g., 0.5 ms, 0.25 ms, or 0.2 ms) shorter than that of the existing LTE systems is used as the transmission time interval of UL transmission and/or DL transmission.

Although the LTE systems will be taken as an example hereinafter, the present embodiment is not limited to this. The present embodiment is applicable to any communication system which performs retransmission control.

(First Aspect)

In a first aspect, a case where the user equipment controls HARQ-ACK transmission on the basis of information concerning an instruction (HARQ-ACK grant) for transmitting HARQ-ACK is described.

Figure 2:
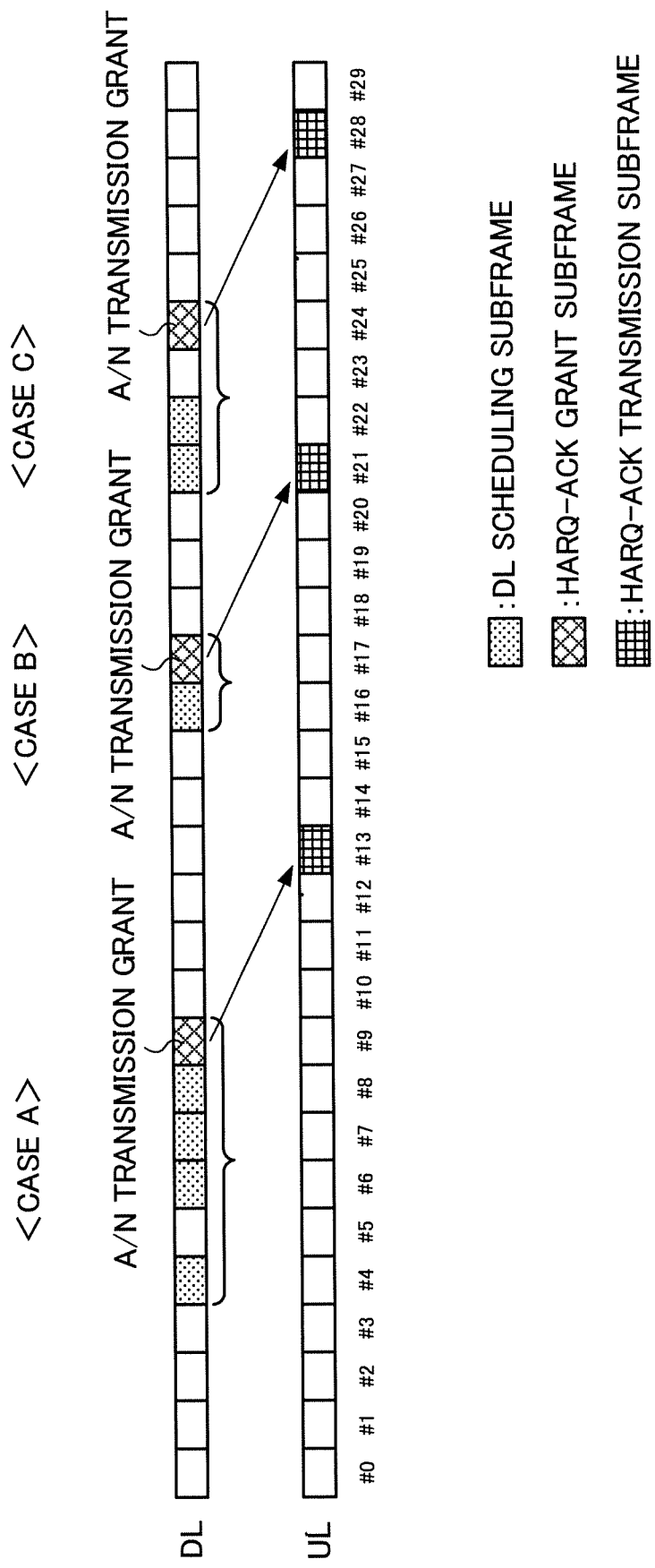
FIG. 2 is a diagram illustrating an exemplary method for transmitting HARQ-ACK in a first aspect.

FIG. 2 illustrates an exemplary case where the user equipment transmits HARQ-ACK on the basis of an HARQ-ACK grant. The user equipment performs an ACK/NACK decision based on the result of a CRC (Cyclic Redundancy Check) check for DL signals (e.g., DL data and PDCCHs) and transmits HARQ-ACK upon receiving information concerning an HARQ-ACK grant, as depicted in FIG. 2.

The user equipment performs an ACK/NACK decision for DL data scheduled (received) until a predetermined timing determined by reception of an HARQ-ACK grant after the previous HARQ-ACK transmission. The predetermined timing determined by reception of an HARQ-ACK grant may be defined as the transmission time interval at which (e.g., a subframe in which) the user equipment receives an HARQ-ACK grant, or a subframe a predetermined period after the subframe in which the user equipment receives an HARQ-ACK grant.

For example, the user equipment feeds back the results of ACK/NACK for DL transmission received in subframes #4 and #6 to #8, in a predetermined subframe based on an HARQ-ACK grant received in subframe #9 (case A in FIG. 2). The predetermined subframe based on an HARQ-ACK grant can be defined as a subframe (subframe #13 in FIG. 2) indicated in the HARQ-ACK grant.

Alternatively, the predetermined subframe based on an HARQ-ACK grant may be defined as a subframe (subframe #13, 4 ms after subframe #9 in FIG. 2) a predetermined period after the subframe in which the user equipment receives an HARQ-ACK grant. The value of the predetermined period may be fixed in the specification or notified to the user equipment from the radio base station by, e.g., upper layer signaling.

The user equipment can feedback the result of ACK/NACK for DL transmission received in subframe #16, in predetermined subframe #21 based on an HARQ-ACK grant received in subframe #17 (case B in FIG. 2). The user equipment can further feedback the results of ACK/NACK for DL transmission received in subframes #21 and #22, in predetermined subframe #28 based on an HARQ-ACK grant received in subframe #24 (case C in FIG. 2).

Information concerning an HARQ-ACK grant can be transmitted using an L1/L2 control signal (e.g., downlink control information (DCI)) in the existing systems. The downlink control information includes a DL assignment including information concerning DL assignment control (scheduling), and a UL grant including information concerning UL assignment control (scheduling).

Figure 3A:
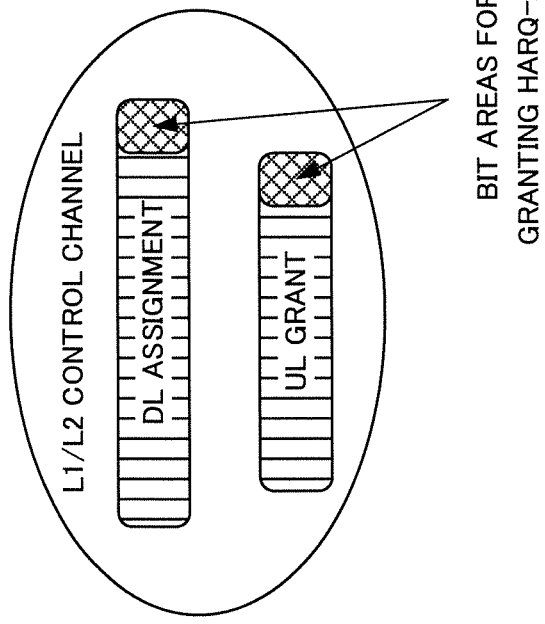
FIG. 3A is a diagram illustrating an exemplary configuration of an L1/L2 control channel.

The radio base station can notify the user equipment of an HARQ-ACK grant using a partial bit field of a DL assignment and/or a UL grant (see FIG. 3A). In this case, an existing DCI format is available. For example, the contents of a prescribed bit field contained in an existing DCI format may be read as an HARQ-ACK grant, an extension field may be set in the certain bit field, or a new bit field may be set.

Alternatively, the radio base station may be configured to notify the user equipment of an HARQ-ACK grant using an L1/L2 control signal (e.g., downlink control information) independent of the existing downlink control information (a DL assignment and a UL grant).

<When DL Assignment and/or UL Grant is Used>

When a DL assignment is used to notify the user equipment of information concerning an HARQ-ACK grant, the radio base station can transmit resource information used in HARQ-ACK transmission and/or information related to, e.g., a signal sequence, as included in the DL assignment. The radio base station can notify the user equipment of at least some of the resource block number (PRB), the bandwidth, and the resource number of a UL channel (e.g., a PUCCH) used in HARQ-ACK transmission as the resource information used in HARQ-ACK transmission.

In this manner, notifying the user equipment of information concerning an HARQ-ACK grant using a DL assignment and/or a UL grant (see FIG. 3A) may omit an independent transmission instruction (downlink control information) for an HARQ-ACK grant. This can suppress the increase in the overhead of an L1/L2 control signal (e.g., downlink control information) transmitted from the radio base station.

Figure 3B:
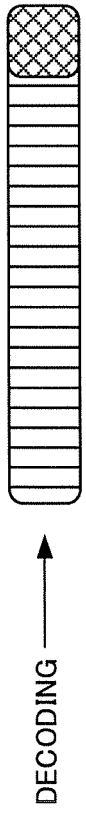
FIGS. 3B and 3C are diagrams illustrating an exemplary method for decoding the L1/L2 control channel.

The user equipment can perform decoding (e.g., blind decoding) assuming downlink control information (a DL assignment or a UL grant) including an HARQ-ACK grant (see FIG. 3B). In this case, the user equipment can perform blind decoding only at the sequence length of downlink control information including an HARQ-ACK grant.

Figure 3C:
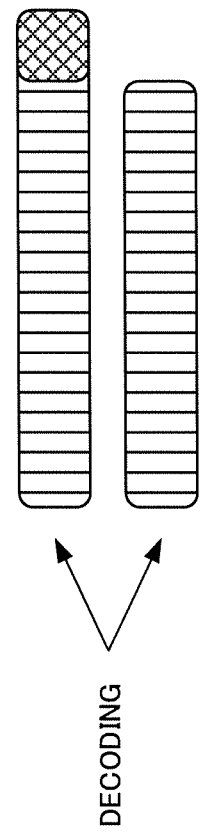

Alternatively, the user equipment may perform decoding assuming both downlink control information including an HARQ-ACK grant and downlink control information including no HARQ-ACK grant (see FIG. 3C). In this case, the user equipment performs blind decoding at the sequence lengths of both the sequence length of the downlink control information including an HARQ-ACK grant and the sequence length of the downlink control information including no HARQ-ACK grant (e.g., two types) and discriminates a sequence length determined to have no error as a result of a CRC check as downlink control information addressed to itself. In this manner, the overhead of downlink control information can be kept less by using both downlink control information including an HARQ-ACK grant and downlink control information including no HARQ-ACK grant so that HARQ-ACK grants are included in the pieces of downlink control information only when such HARQ-ACK grants may be preferably involved.

<When Independent L1/L2 Control Signal is Used>

Figure 4:
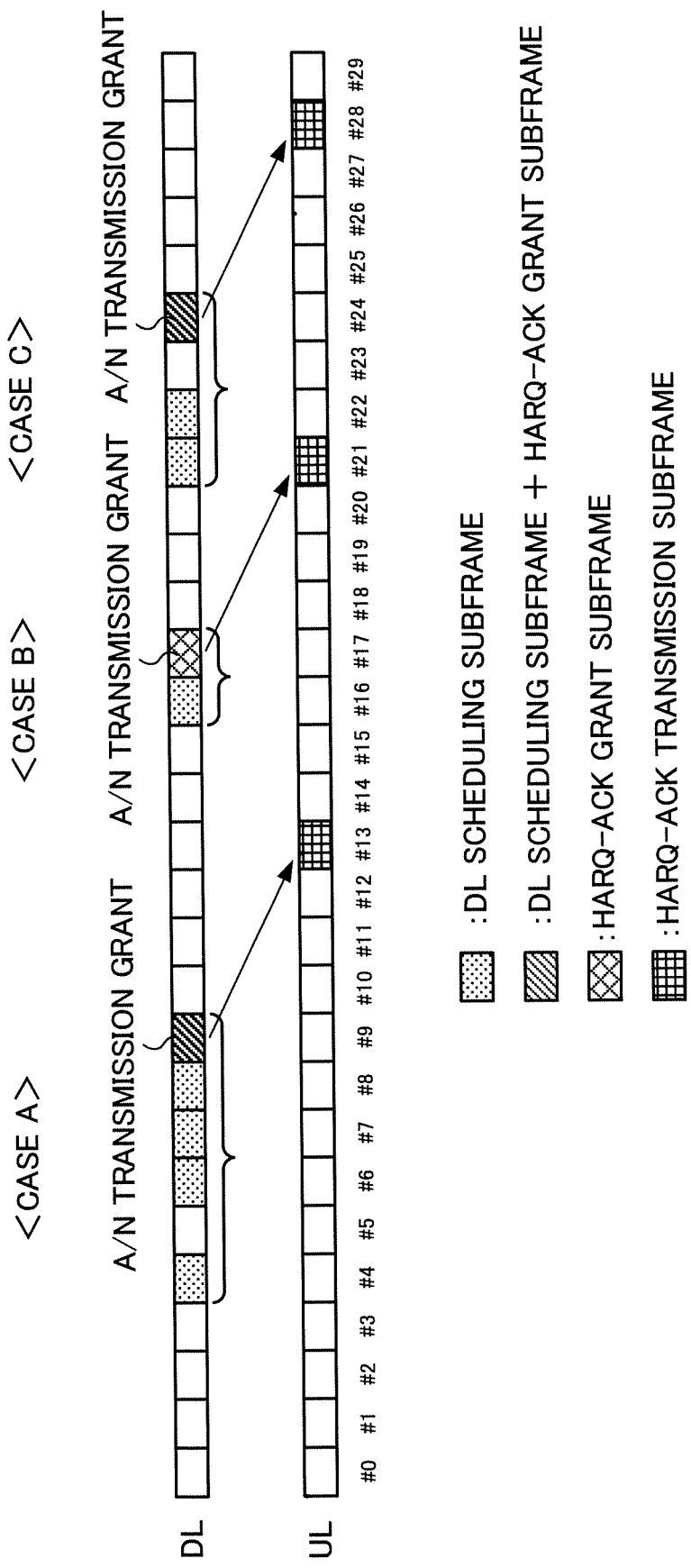
FIG. 4 is a diagram illustrating another exemplary method for transmitting HARQ-ACK in the first aspect.

When the radio base station notifies the user equipment of information concerning an HARQ-ACK grant as included in an independent L1/L2 control signal (e.g., downlink control, information), the user equipment detects an HARQ-ACK grant independently of a DL assignment or a UL grant (see FIG. 4).

FIG. 4 illustrates a case where that downlink control information including information concerning an HARQ-ACK grant and downlink control information including a DL assignment or a UL grant are transmitted in the same or different subframes. For example, the user equipment feeds back the results of ACK/NACK for DL transmission received in subframes #4 and #6 to #9, in a predetermined subframe based on an UARQ-ACK grant received in subframe #9 (case A in FIG. 4). In this case, the user equipment can receive a DL signal (DL data and a DL assignment) and an HARQ-ACK grant respectively in subframe #9.

The user equipment can further feedback the result of ACK/NACK for DL transmission received in subframe #16, in predetermined subframe #21 based on an HARQ-ACK grant received in subframe #17 (case B in FIG. 4). In this case, the user equipment receives an HARQ-ACK grant without receiving DL data in subframe #17.

The user equipment can further feedback the results of ACK/NACK for DL transmission received in subframes #21, #22, and #24, in predetermined subframe #28 based on an HARQ-ACK grant received in subframe #24 (case C in FIG. 4). In this case, the user equipment can receive a DL signal (DL data and a DL assignment) and an HARQ-ACK grant respectively in subframe #24.

In this manner, notifying the user equipment of information concerning an HARQ-ACK grant as included in independent downlink control information allows the radio base station to issue an instruction to transmit HARQ-ACK even at the timing when DL scheduling/UL scheduling is not carried out. Similarly, the user equipment can feedback HARQ-ACK even at the timing when DL scheduling/UL scheduling is not carried out. It suffices for the user equipment to perform reception processing (e.g., blind detection) for types of downlink control information, in subframes (subframes #9 and #24 in FIG. 4) including both DL scheduling/UL scheduling and an HARQ-ACK grant.

The radio base station can transmit resource information used in HARQ-ACK transmission and/or information related to, e.g., a signal sequence, as included in downlink control information including an HARQ-ACK grant. The radio base station can notify the user equipment of at least some of the resource block number (PRB), the bandwidth, and the resource number of a UL channel (e.g., a PUCCH) used in HARQ-ACK transmission as the resource information used in HARQ-ACK transmission.

<Feedback Method for User Equipment>

The user equipment can generate HARQ-ACK corresponding to each DL subframe as an independent bit and transmit by one UL transmission operation, a code sequence obtained by encoding the generated bits (e.g., a PUCCH and/or a PUSCH). In other words, the user equipment can perform control to encode each of HARQ-ACK for DL signals corresponding to an HARQ-ACK grant and feed them back.

In, e.g., case A of FIG. 2, the user equipment can respectively generate ACK/NACK bits for DL signals received in subframes #4, #6, #7, and #8 and transmit in UL subframe #13, a code sequence obtained by encoding the generated bits.

When CWs (Code Words) or TBs (Transport Blocks) are set in DL transmission of each DL subframe, the user equipment can generate ACK/NACK using HARQ-ACK as an independent bit for each CW. Alternatively, the user equipment may generate ACK/NACK by calculating an XOR of HARQ-ACK for each CW (using ACK/NACK spatial bundling).

Alternatively, the user equipment may transmit by one UL transmission operation (e.g., a PUCCH and/or a PUSCH), a code sequence obtained by calculating an XOR of HARQ-ACK corresponding to the DL subframe (ACK/NACK temporal bundling), compressing the HARQ-ACK to 1 or 2 bits, and encoding the HARQ-ACK. In other words, the user equipment can perform control to apply ACK/NACK bundling to HARQ-ACK signals for DL signals corresponding to an HARQ-ACK grant and then encode and transmit them.

In, e.g., case A of FIG. 2, the user equipment can transmit in UL subframe #13, a code sequence obtained by applying ACK/NACK bundling to DL signals received in subframes #4, #6, #7, and #8 to set ACK when ACK applies to all of them, or NACK when NACK applies to even one of them, and then encoding HARQ-ACK.

When CWs (Code Words) or TBs (Transport Blocks) are set in DL transmission of each DL subframe, not only temporal bundling but also spatial bundling may be employed.

The radio base station may transmit to the user equipment, information concerning a subframe in which a DL assignment takes place, as included in an HARQ-ACK grant or an L1/L2 control signal (e.g., downlink control information) including the HARQ-ACK grant. For example, the radio base station can notify the user equipment of a bitmap field indicating a subframe in which a DL assignment takes place and a DAI (Downlink Assignment Indicator (Index)) field for identifying a DL assignment detection error, as included in a DL assignment in which a DL assignment takes place in each subframe, an HARQ-ACK grant, and/or downlink control information including the HARQ-ACK grant.

In the DAI field, different values (cumulative values) are set in the order of subframes in which DL data assignments (DL scheduling) take place. The user equipment can determine that an error has occurred in receiving a DL signal when the DAI values contained in downlink control information or the like are discontinuous.

Figure 5:
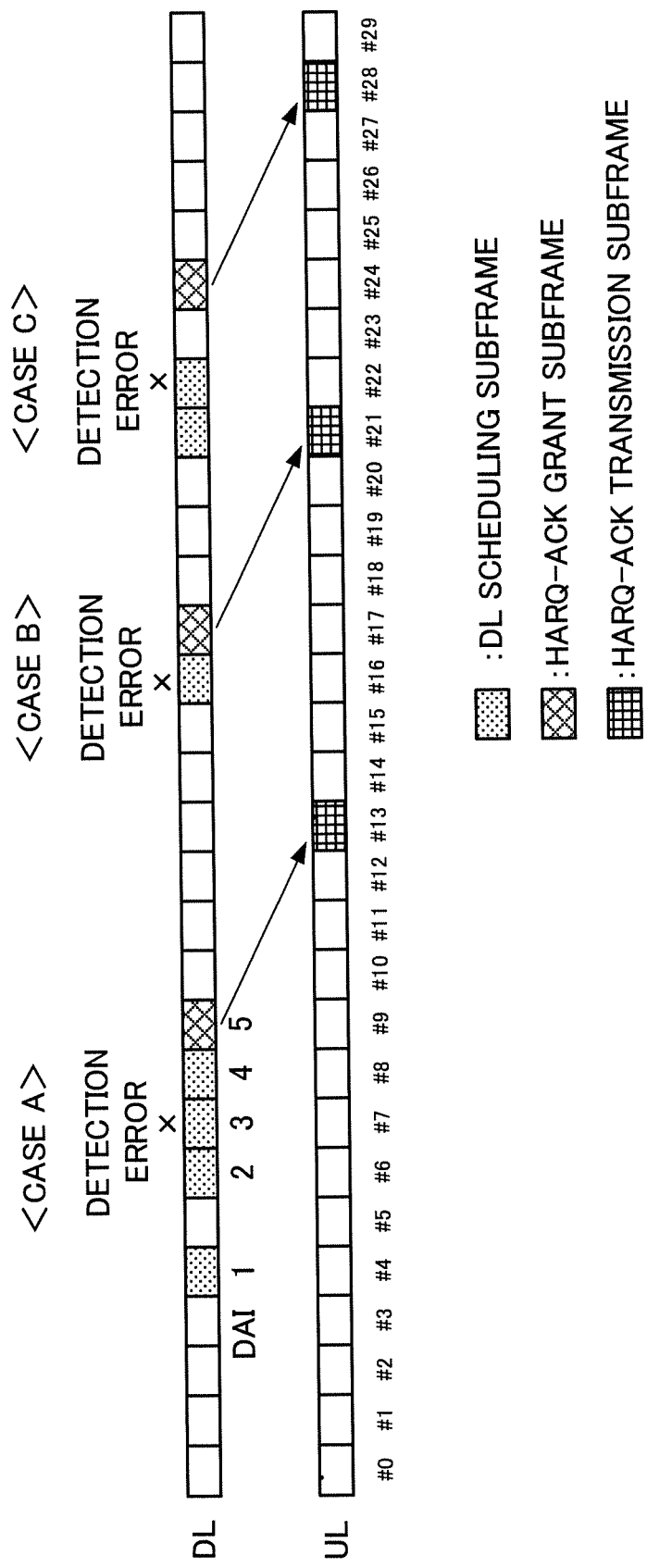
FIG. 5 is a diagram illustrating still another exemplary method for transmitting HARQ-ACK in the first aspect.

In, e.g., case A of FIG. 5, the radio base station can respectively set different DAI values for DL signals (e.g., pieces of downlink control information) transmitted in subframes #4, #6, #7, and #8 and information concerning an HARQ-ACK grant transmitted in subframe #9 and transmit them to the user equipment. The user equipment can determine whether a detection error has occurred on the basis of the DAI values contained in each piece of downlink control information and an HARQ-ACK grant (or downlink control information including an HARQ-ACK grant).

In, e.g., case A of FIG. 5, when the user equipment makes an error in detecting a DL signal transmitted in subframe #7, it may detect no DAI value (e.g., DAI=3) contained in the downlink control information of subframe #7. In this case, the user equipment can determine that a detection error has occurred in subframe #7 on the basis of the DAI value (DAI=2) contained in the downlink control information of subframe #6 and the DAI value (DAI=4) contained in the downlink control information of subframe #8.

The radio base station may set a bitmap field indicating DL data assignment (DL scheduling) information in an HARQ-ACK grant or downlink control information including the HARQ-ACK grant. In, e.g., case A of FIG. 2, the radio base station notifies the user equipment of the bitmap "1, 0, 1, 1, 1, 0" indicating DL assignment information for subframes #4 to #9. It is assumed herein that "1" holds when a DL assignment takes place, and "0" holds when no DL assignment takes place. The bitmap information may be included in the downlink control information of each DL signal, included in the pieces of downlink control information of some DL signals, or included only in HARQ-ACK grants.

In this manner, notifying the user equipment of information concerning a subframe in which a DL assignment takes place, as included in an HARQ-ACK grant or an L1/L2 control signal including the HARQ-ACK grant, allows the user equipment side to appropriately detect a detection error and transmit HARQ-ACK.

(Second Aspect)

A user equipment operation when no HARQ-ACK grant has been detected for a predetermined period will be described in a second aspect.

As described above in the first aspect, the user equipment transmits ACK/NACK on the basis of an HARQ-ACK grant notified from the radio base station, thus allowing flexible HARQ-ACK control (e.g., the transmission timing). On the other hand, a case where the user equipment may not receive an HARQ-ACK grant or an L1/L2 control signal (e.g., downlink control information) including the HARQ-ACK grant due, e.g., to a detection error is assumed. In this case, since the user equipment stops feeding back HARQ-ACK for a long period of time, communication may fail or delay.

To solve the above-mentioned problem, in the second aspect, the user equipment performs control to transmit HARQ-ACK on the basis of a predetermined condition when no HARQ-ACK grant can be received. When, for example, the user equipment receives no HARQ-ACK grant within a predetermined period (e.g., X subframes) after receiving a DL signal (e.g., a first DL signal), it can perform control to transmit HARQ-ACK. The first DL signal may be defined as the earliest received DL signal of received DL signals for which HARQ-ACK transmission is not performed.

Figure 6:
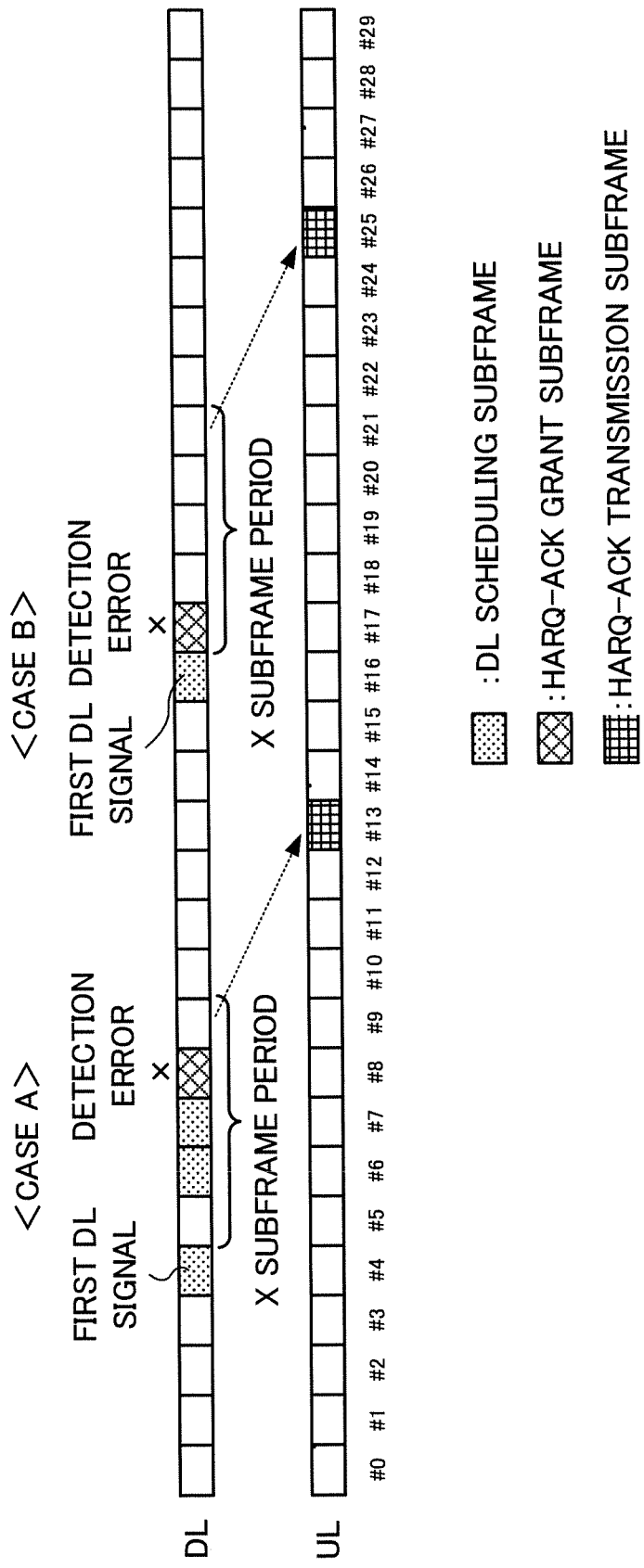
FIG. 6 is a diagram illustrating an exemplary method for transmitting HARQ-ACK in a second aspect.

FIG. 6 illustrates an exemplary operation for transmitting HARQ-ACK by the user equipment when no HARQ-ACK grant can be received. In case A of FIG. 6, a case where the radio base station respectively transmits DL signals in subframes #4, #6, and #7 and further transmits an HARQ-ACK grant (or downlink control information including the HARQ-ACK grant) for the DL signals in subframe #8 is illustrated. It is assumed a case where the user equipment makes an error in detecting an HARQ-ACK grant (or downlink control information including the HARQ-ACK grant) transmitted in subframe #8.

In this case, the user equipment may detect no HARQ-ACK grant within X subframes (X=5 in this case) after a subframe (subframe #4 in this case) in which a first DL signal has been received. The user equipment can transmit HARQ-ACK regardless of an HARQ-ACK grant (without an HARQ-ACK grant), in subframe #13 that is a predetermined period (e.g., nine subframes) after subframe #4 in which a first DL signal has been received.

Alternatively, the user equipment can perform control to transmit HARQ-ACK in a predetermined period (e.g., 4 ms after) after X subframes (subframe #9 in this case). The value of the predetermined period may be fixedly defined in the specification or notified from the radio base station to the user equipment by, e.g., upper layer signaling.

The user equipment may use ACK/NACK to be transmitted within a predetermined period after reception of a first DL signal or HARQ-ACK to be transmitted within a predetermined period after X subframes as ACK/NACK for a DL signal received within a predetermined range. The user equipment may use, e.g., ACK/NACK for a DL signal received within X subframes (until subframe #9) after subframe #4 in which a first DL signal has been received as ACK/NACK for a DL signal received within a predetermined range. In the case illustrated in FIG. 6, the user equipment transmits in subframe #13, ACK/NACK for a DL signal received until subframe #9 that is X subframes (X=5 in this case) after subframe #4 in which a first DL signal has been received.

In case B of FIG. 6, the user equipment may detect no HARQ-ACK grant until subframe #21 that is X subframes (X=5 in this case) after a subframe (subframe #16 in this case) in which a first DL signal has been received. The user equipment can transmit HARQ-ACK regardless of an HARQ-ACK grant, in subframe #25 that is a predetermined period (e.g., nine subframes) after subframe #16.

Alternatively, the user equipment can perform control to transmit HARQ-ACK in subframe #25 that is a predetermined period (e.g., four subframes) after X subframes (subframe #21 in this case).

In this manner, permitting HARQ-ACK transmission even when the user equipment makes an error in detecting an HARQ-ACK grant can avoid the situation in which the user equipment feeds back no HARQ-ACK. This can suppress the HARQ-ACK transmission delay at a prescribed value or less. The user equipment performs control to transmit HARQ-ACK after a predetermined period when it has received no HARQ-ACK grant, thus allowing practical application even to operations which use no HARQ-ACK grants.

When the user equipment transmits HARQ-ACK after a predetermined period (e.g., a predetermined period after the first DL reception time) without receiving an HARQ-ACK grant, a resource used in the HARQ-ACK transmission may be preset. For example, the radio base station can notify, in advance, the user equipment of resource information applied to HARQ-ACK transmitted on the basis of no HARQ-ACK grant by, e.g., upper layer signaling. The radio base station can notify the user equipment of information (e.g., PRB or a resource) concerning a resource for a UL control channel (e.g., a PUCCH) as the resource information.

This can suppress contention between a UL control channel transmitted by a user equipment which has made an error in detecting an HARQ-ACK grant and a UL control channel transmitted by a user equipment which has appropriately detected an HARQ-ACK grant.

When the user equipment may not receive at least an HARQ-ACK grant, it may generate an HARQ-ACK bit sequence assuming that assignments (DL transmission) take place for all DL subframes corresponding to HARQ-ACK transmission. In, e.g., case A of FIG. 6, the user equipment can control HARQ-ACK transmission assuming that DL transmission takes place for all subframes within the period of X subframes (subframes #4 to #9) after a subframe in which a first DL signal has been received.

Thus, even when the user equipment may not identify a DL subframe in which an error has occurred in detecting an HARQ-ACK grant, the user equipment and the radio base station can recognize the same ACK/NACK bit sequence (ACK/NACK code book size).

When neither a bitmap nor a DAI indicating in which DL subframe an assignment takes place is used, an HARQ-ACK bit sequence is desirably generated assuming that assignments (DL transmission) take place for all DL subframes corresponding to HARQ-ACK transmission, regardless of whether an HARQ-ACK grant can be received.

Alternatively, the user equipment may generate and feedback NACK having predetermined bits, regardless of success in receiving a DL signal, when it may detect no HARQ-ACK grant. The user equipment can generate NACK having one or bits in accordance with the transmission mode to be applied. When, for example, a transmission mode of 2 CW or more is set, the user equipment generates and feeds back NACK having bits corresponding in number to each CW. When a transmission mode of 1 CW is set, the user equipment can generate and feedback 1-bit NACK.

In other words, when the user equipment may not detect an HARQ-ACK grant, it can feedback NACK assuming that NACK applies to all DL signals corresponding to the HARQ-ACK grant. In this case, when the radio base station receives 1- or 2-bit NACK in a predetermined resource and/or timing, it can recognize that the user equipment has received no HARQ-ACK grant. In this case, the radio base station can perform control to retransmit all pieces of DL data (DL data corresponding to an HARQ-ACK grant) corresponding to the HARQ-ACK.

(Wireless Communication System)

The configuration of a wireless communication system according to an embodiment of the present invention will be described below. The wireless communication method according to each of the above-mentioned aspects is applied to the wireless communication system. The wireless communication methods according to the above-mentioned respective aspects may be applied independently or in combination.

Figure 7:
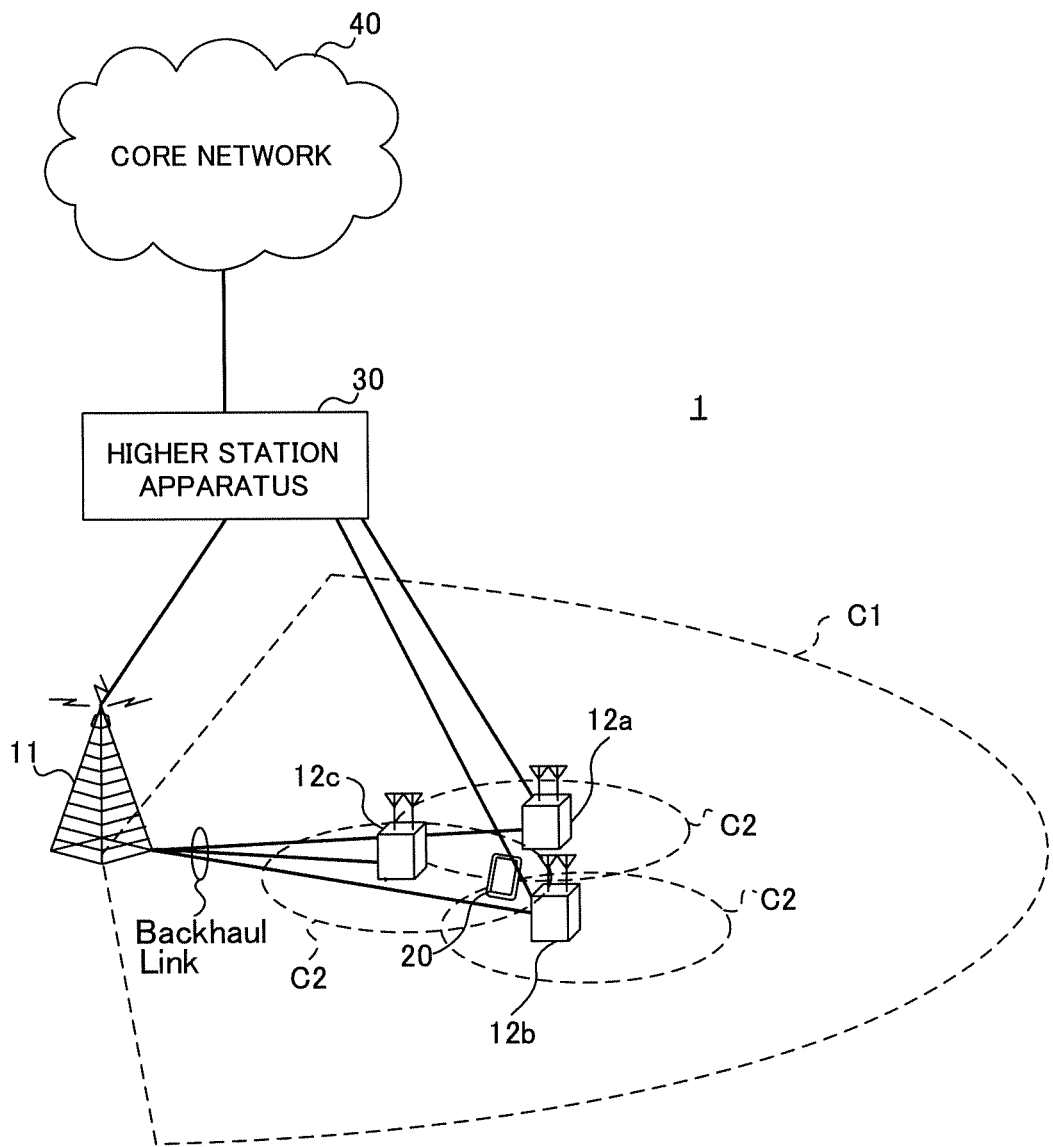
FIG. 7 is a schematic configuration diagram illustrating an exemplary schematic configuration of a wireless communication system according to the present embodiment.

FIG. 7 is a diagram illustrating an exemplary schematic configuration of a wireless communication system according to an embodiment of the present invention. In a wireless communication system 1, CA (Carrier Aggregation) and/or DC (Dual Connectivity) which integrates fundamental frequency blocks (component carriers) with the system bandwidth (e.g., 20 MHz) of the LTE system as a unit is applicable. The wireless communication system 1 may be called, e.g., SUPER 3G, LTE-A (LTE-Advanced), IMT-Advanced, 4G, 5G, or FRA (Future Radio Access).

The wireless communication system 1 depicted in FIG. 7 includes a radio base station 11 forming a macrocell C1, and radio base stations 12a to 12c forming small cells C2 which are located in the macrocell C1 and more local than the macrocell C1. A user equipment 20 resides in the macrocell C1 and each small cell C2.

The user equipment 20 is connectable to both the radio base station 11 and the radio base stations 12. The user equipment 20 is expected to simultaneously use the macro-cell C1 and the small cell C2 that use different frequencies by CA or DC. The user equipment 20 may employ CA or DC using cells (CCs) (e.g., six or more CCs). A shortened TTI is applicable to UL transmission and/or DL transmission between the user equipment 20 and the radio base station 11/radio base stations 12.

The user equipment 20 and the radio base station 11 can communicate with each other using a carrier (the existing carrier called, e.g., Legacy carrier) having a narrow bandwidth in a relatively low frequency band (e.g., 2 GHz). The user equipment 20 and the radio base stations 12 may communicate with each other using a carrier having a wide bandwidth in a relatively high frequency band (e.g., 3.5 or 5 GHz) or using the same carrier as in communication with the radio base station 11. The configuration of the frequency band used by each radio base station is not limited to this.

Wired connection (e.g., an X2 interface or an optical fiber conforming to the CPRI (Common Public Radio Interface)) or wireless connection may be established between the radio base station 11 and the radio base stations 12 (or between the two radio base stations 12).

The radio base station 11 and each radio base station 12 are respectively connected to a host station device 30 and further connected to a core network 40 via the host station device 30. Although the host station device 30 includes, e.g., an access gateway device, an RNC (Radio Network Controller), and an MME (Mobility Management Entity), the present invention is not limited to this. Each radio base station 12 may be connected to the host station device 30 via the radio base station 11.

The radio base station 11 has a relatively wide coverage and may be called, e.g., a macro base station, an aggregation node, an eNB (eNodeB), or a transmission and reception point. The radio base station 12 has a local coverage and may be called e.g., a small base station, a micro base station, a pico base station, a femto base station, an HeNB (Home eNodeB), an RRH (Remote Radio Head), or a transmission and reception point. The radio base stations 11 and 12 will be collectively referred to as radio base stations 10 hereinafter when no distinction is made between them.

Each user equipment 20 is a terminal that is compatible with various communication schemes such as LTE and LTE-A and may include not only mobile communication terminal but also fixed communication terminal.

The wireless communication system 1 uses as a radio access scheme, OFDMA (Orthogonal Frequency Division Multiple Access) for downlinks and SC-FDMA (Single-Carrier Frequency Division Multiple Access) for uplinks. OFDMA is a multicarrier transmission scheme for communication by dividing a frequency band into narrow frequency bands (subcarriers) and mapping data to each subcarrier. SC-FDMA is a single-carrier transmission scheme for dividing the system bandwidth into bands including one or continuous resource block for each terminal, and allowing these terminals to use different bands, thus alleviating inter-terminal interference. The uplink and downlink radio access schemes are not limited to these combinations and OFDMA may be used for uplinks.

The wireless communication system 1 uses, e.g., a PDSCH (Physical Downlink Shared Channel) shared by each user equipment 20, a PBCH (Physical Broadcast Channel), and a downlink L1/L2 control channel as downlink channels. The PDSCH is used to transmit, e.g., user data, upper layer control information, and an SIB (System Information Block). The PBCH is used to transmit an MIB (Master Information Block).

The downlink L1/L2 control channel includes, e.g., downlink control channels (a PDCCH (Physical Downlink Control Channel) and an EPDCCH (Enhanced Physical Downlink Control Channel)), a PCFICH (Physical Control Format Indicator Channel), and a PHICH (Physical Hybrid-ARQ Indicator Channel). The PDCCH is used to transmit, e.g. DCI (Downlink Control Information) including scheduling information of PDSCHs and PUSCHs. The PCFICH is used to transmit the number of OFDM symbols used in the PDCCH. The PHICH is used to transmit HARQ delivery acknowledgement information (ACK/NACK) for the PUSCH. The EPDCCH is frequency-division-multiplexed with the PDSCH (Physical Downlink Shared Channel) and used to transmit, e.g., DCI, like the PDCCH.

The wireless communication system 1 uses, e.g., a PUSCH (Physical Uplink Shared Channel) shared by each user equipment 20, a PUCCH (Physical Uplink Control Channel), and a PRACH (Physical Random Access Channel) as uplink channels. The PUSCH is used to transmit user data and upper layer control information. The PUSCH or the PUCCH is used to transmit UCI (Uplink Control Information) including at least one of, e.g., delivery acknowledgement information (ACK/NACK) and wireless quality information (CQI). The PRACH is used to transmit a random access preamble for establishing connection with a cell.

<Radio Base Station>

Figure 8:
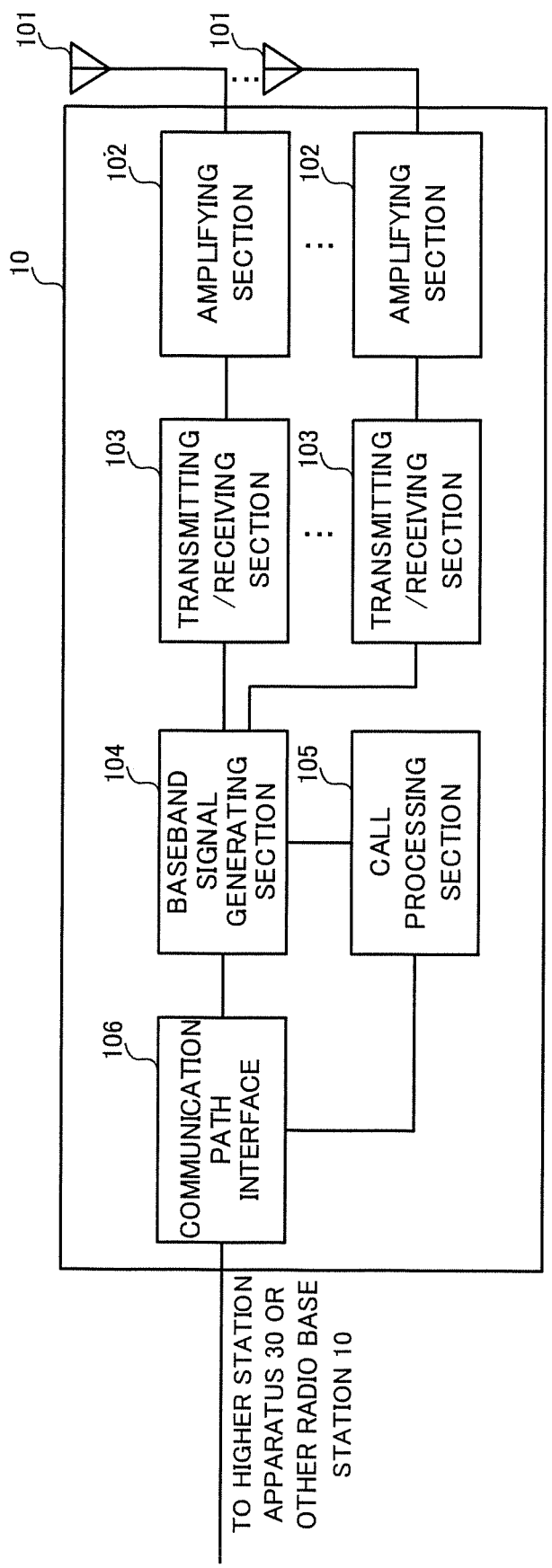
FIG. 8 is a diagram illustrating an exemplary configuration of an entire radio base station according to the present embodiment.

FIG. 8 is a diagram illustrating an exemplary configuration of an entire radio base station according to an embodiment of the present invention. The radio base station 10 includes transmission and reception antennas 101, amplification units 102, transmission and reception units 103, a baseband signal processing unit 104, a call processing unit 105, and a transmission line interface 106. The transmission and reception unit 103 includes a transmission unit and a reception unit.

User data transmitted from the radio base station 10 to the user equipment 20 by a downlink is input from the host station device 30 to the baseband signal processing unit 104 via the transmission line interface 106.

The baseband signal processing unit 104 performs transmission processing for the user data, such as PDCP (Packet Data Convergence Protocol) layer processing, user data division and Coupling, RLC (Radio Link Control) layer transmission processing such as RLC retransmission control, MAC (Medium Access Control) retransmission control (e.g., HARQ (Hybrid Automatic Repeat reQuest) transmission processing), scheduling, transport format selection, channel encoding, IFFT (Inverse Fast Fourier Transform) processing, and precoding processing, and transfers the user data to the transmission and reception units 103. Transmission processing such as channel encoding and IFFT is also performed for downlink control signals, which are then transferred to the transmission and reception units 103.

The transmission and reception unit 103 converts a baseband signal precoded and output from the baseband signal processing unit 104 for each antenna into a radio frequency band and transmits it. The radio frequency signal after frequency conversion by the transmission and reception unit 103 is amplified by the amplification unit 102 and transmitted from the transmission and reception antenna 101.

The transmission and reception unit (reception unit) 103 receives HARQ-ACK transmitted from the user equipment. The transmission and reception unit (transmission unit) 103 can transmit information for issuing an instruction to transmit a delivery acknowledgement signal, to the user equipment using an L1/L2 control signal (e.g., downlink control information) or upper layer signaling (e.g., RRC signaling).

The information for issuing an instruction to transmit a delivery acknowledgement signal may include not only an HARQ-ACK grant, but also resource information used in HARQ-ACK transmission by the HARQ-ACK grant and information concerning a signal sequence. The transmission and reception unit 103 may be implemented as a transmitter/receiver, a transmission and reception circuit, or a transmission and reception device described on the basis of a common understanding in the technical field according to the present invention. The transmission and reception unit 103 may serve as an integrated transmission and reception unit or include a transmission unit and reception unit.

As for uplink signals, a radio frequency signal received by the transmission and reception antenna 101 is amplified by the amplification unit 102. The transmission and reception unit 103 receives the uplink signal amplified by the amplification unit 102. The transmission and reception unit 103 performs frequency conversion of the received signal into a baseband signal and outputs it to the baseband signal processing unit 104.

The baseband signal processing unit 104 performs FFT (Fast Fourier Transform) processing, IDFT (Inverse Discrete Fourier Transform) processing, error correction decoding, MAC retransmission control reception processing, and RLC layer and PDCP layer reception processing, for user data contained in input uplink signals, and transfers the user data to the host station device 30 via the transmission line interface 106. The call processing unit 105 performs call processing such as communication channel setup and release, state management of the radio base station 10, and radio resource management.

The transmission line interface 106 exchanges signals with the host station device 30 via a predetermined interface. The transmission line interface 106 may exchange signals with a neighboring radio base station 10 (backhaul signaling) via an interface between base stations (e.g., an X2 interface or an optical fiber conforming to the CPRI (Common Public Radio Interface)).

Figure 9:
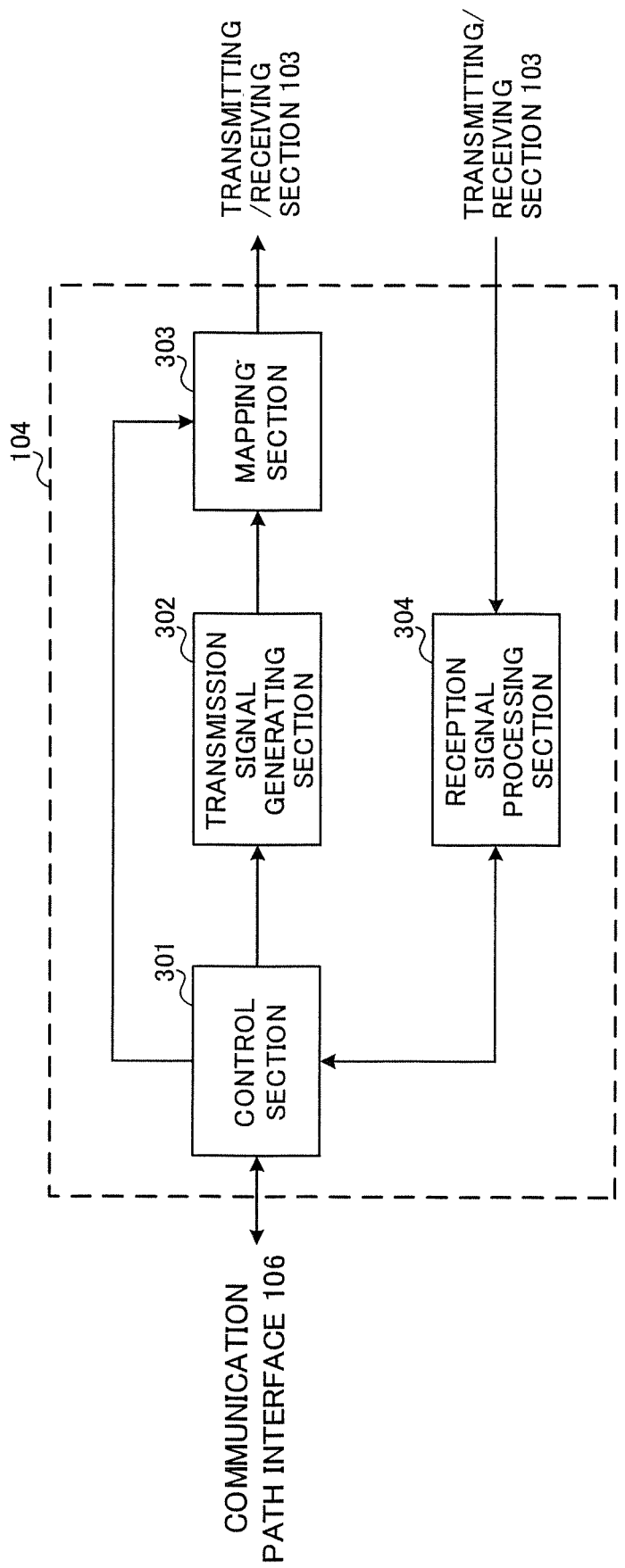
FIG. 9 is a diagram illustrating an exemplary functional configuration of the radio base station according to the present embodiment.

FIG. 9 is a diagram illustrating an exemplary functional configuration of the radio base station according to the present embodiment. FIG. 9 mainly illustrates functional blocks of feature portions in the present embodiment and the radio base station 10 also includes other functional blocks involved in wireless communication. The baseband signal processing unit 104 includes a control unit (scheduler) 301, a transmission signal generation unit (generation unit) 302, a mapping unit 303, and a received signal processing unit 304, as illustrated in FIG. 9.

The control unit (scheduler) 301 controls scheduling (e.g., resource assignment) of downlink data signals transmitted by PDSCHs and downlink control signals transmitted by PDCCHs and/or EPDCCHs. The control unit 301 further controls scheduling of, e.g., system information, sync signals, paging information, CRSs (Cell-specific Reference Signals), and CSI-RSs (Channel State Information Reference Signals). The control unit 301 even controls scheduling of, e.g., uplink reference signals, uplink data signals transmitted by PUSCHs, and uplink control signals transmitted by PUCCHs and/or PUSCHs.

The control unit 301 controls downlink data retransmission/new data transmission on the basis of a delivery acknowledgement signal (HARQ-ACK) fed back from the user equipment. The control unit 301 may be implemented as a controller, a control circuit, or a control device described on the basis of a common understanding in the technical field according to the present invention.

The transmission signal generation unit 302 generates a DL signal (including a downlink data signal and a downlink control signal) on the basis of an instruction from the control unit 301 and outputs it to the mapping unit 303. More specifically, the transmission signal generation unit 302 generates a downlink data signal (PDSCH) including user data and outputs it to the mapping unit 303. The transmission signal generation unit 302 further generates a downlink control signal (PDCCH/EPDCCH) including DCI (a UL grant and a DL assignment) and outputs it to the mapping unit 303.

The transmission signal generation unit 302 can further generate downlink control information including an HARQ-ACK grant using a partial bit field of existing downlink control information (a DL assignment and/or a UL grant) (see FIG. 3A). Alternatively, the transmission signal generation unit 302 can generate an L1/L2 control signal (e.g., downlink control information) including information concerning an HARQ-ACK grant, independently of the existing downlink control information (a DL assignment and a UL grant). The transmission signal generation unit 302 further generates downlink reference signals such as a CRS and a CSI-RS and outputs them to the mapping unit 303. The transmission signal generation unit 302 may be implemented as a signal generator, a signal generation circuit, or a signal generation device described on the basis of a common understanding in the technical field according to the present invention.

The mapping unit 303 maps the DL signal generated by the transmission signal generation unit 302 to a predetermined radio resource on the basis of an instruction from the control unit 301 and outputs it to the transmission and reception unit 103. The mapping unit 303 may be implemented as a mapper, a mapping circuit, or a mapping device described on the basis of a common understanding in the technical field according to the present invention.

The received signal processing unit 304 performs reception processing (e.g., demapping, demodulation, and decoding) for a UL signal (e.g., HARQ-ACK or a PUSCH) transmitted from the user equipment 20. The processing result is output to the control unit 301.

The received signal processing unit 304 may be implemented as a set of a signal processor, a signal processing circuit, or a signal processing device and a gauge, a measurement circuit, or a measurement device described on the basis of a common understanding in the technical field according to the present invention.

<User Equipment>

Figure 10:
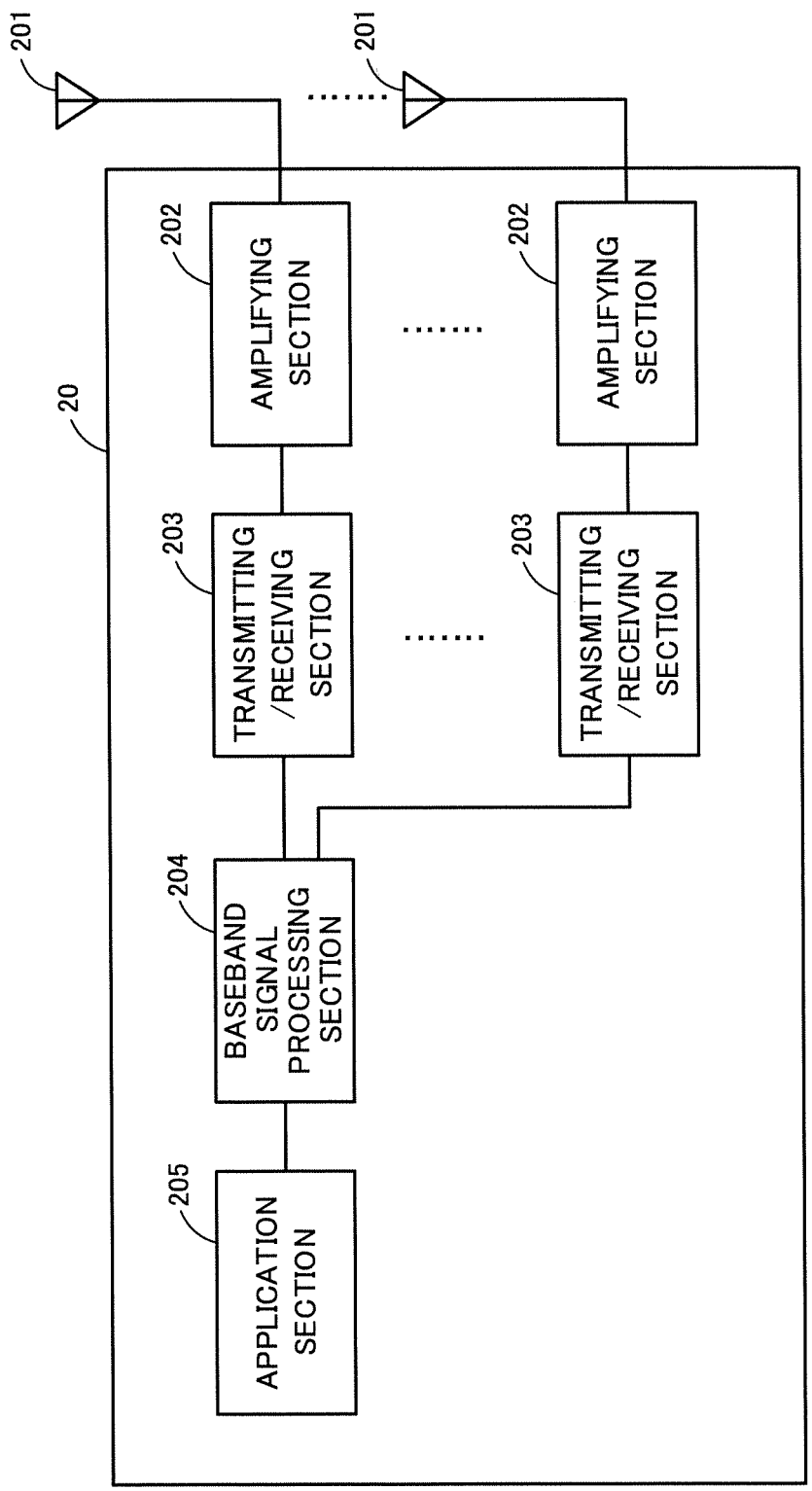
FIG. 10 is a diagram illustrating an exemplary configuration of an entire user equipment according to the present embodiment.

FIG. 10 is a diagram illustrating an exemplary configuration of an entire user equipment according to an embodiment of the present invention. The user equipment 20 includes transmission and reception antennas 201 for MIMO transmission, amplification units 202, transmission and reception units 203, a baseband signal processing unit 204, and an application unit 205. The transmission and reception unit 203 may include a transmission unit and a reception unit.

Radio frequency signals received by the transmission and reception antennas 201 are respectively amplified by the amplification units 202. Each transmission and reception unit 203 receives downlink signals amplified by the amplification units 202. The transmission and reception units 203 perform frequency conversion of the received signals into baseband signals and output them to the baseband signal processing unit 204.

The transmission and reception unit (reception unit) 203 receives, e.g., DL data signals (e.g., a PDSCH) and DL control signals (e.g., a UL grant and a DL assignment). The transmission and reception unit (reception unit) 203 can further receive information (e.g., an HARQ-ACK grant) concerning an instruction to transmit a delivery acknowledgement signal. The transmission and reception unit (reception unit) 203 can even receive information concerning a resource and/or a signal sequence for transmitting a delivery acknowledgement signal as existing downlink control information (e.g., a DL assignment).

The transmission and reception unit (reception unit) 203 can receive information concerning an instruction to transmit a delivery acknowledgement signal as downlink control information different from a UL grant and a DL assignment. The transmission and reception unit (reception unit) 203 can further receive information concerning a resource and/or a signal sequence for transmitting a delivery acknowledgement signal as downlink control information including information concerning an instruction to transmit a delivery acknowledgement signal. The transmission and reception unit 203 may be implemented as a transmitter/receiver, a transmission and reception circuit, or a transmission and reception device described on the basis of a common understanding in the technical field according to the present invention.

The baseband signal processing unit 204 performs, e.g., FFT processing, error correction decoding, and retransmission control reception processing for an input baseband signal. User data on a downlink is transferred to the application unit 205. The application unit 205 performs, e.g., processing associated with layers above a physical layer and a MAC layer. Broadcast information of the data on a downlink is also transferred to the application unit 205.

User data on an uplink is input from the application unit 205 to the baseband signal processing unit 204. The baseband signal processing unit 204 performs, e.g., retransmission control transmission processing (e.g., HARQ transmission processing), channel encoding, precoding, DFT (Discrete Fourier Transform) processing, and IFFT processing and transfers baseband signals to each transmission and reception unit 203. The transmission and reception units 203 convert the baseband signals output from the baseband signal processing unit 204 into radio frequency bands and transmit them. The radio frequency signals after frequency conversion by the transmission and reception units 203 are amplified by the amplification units 202 and transmitted from the transmission and reception antennas 201.

Figure 11:
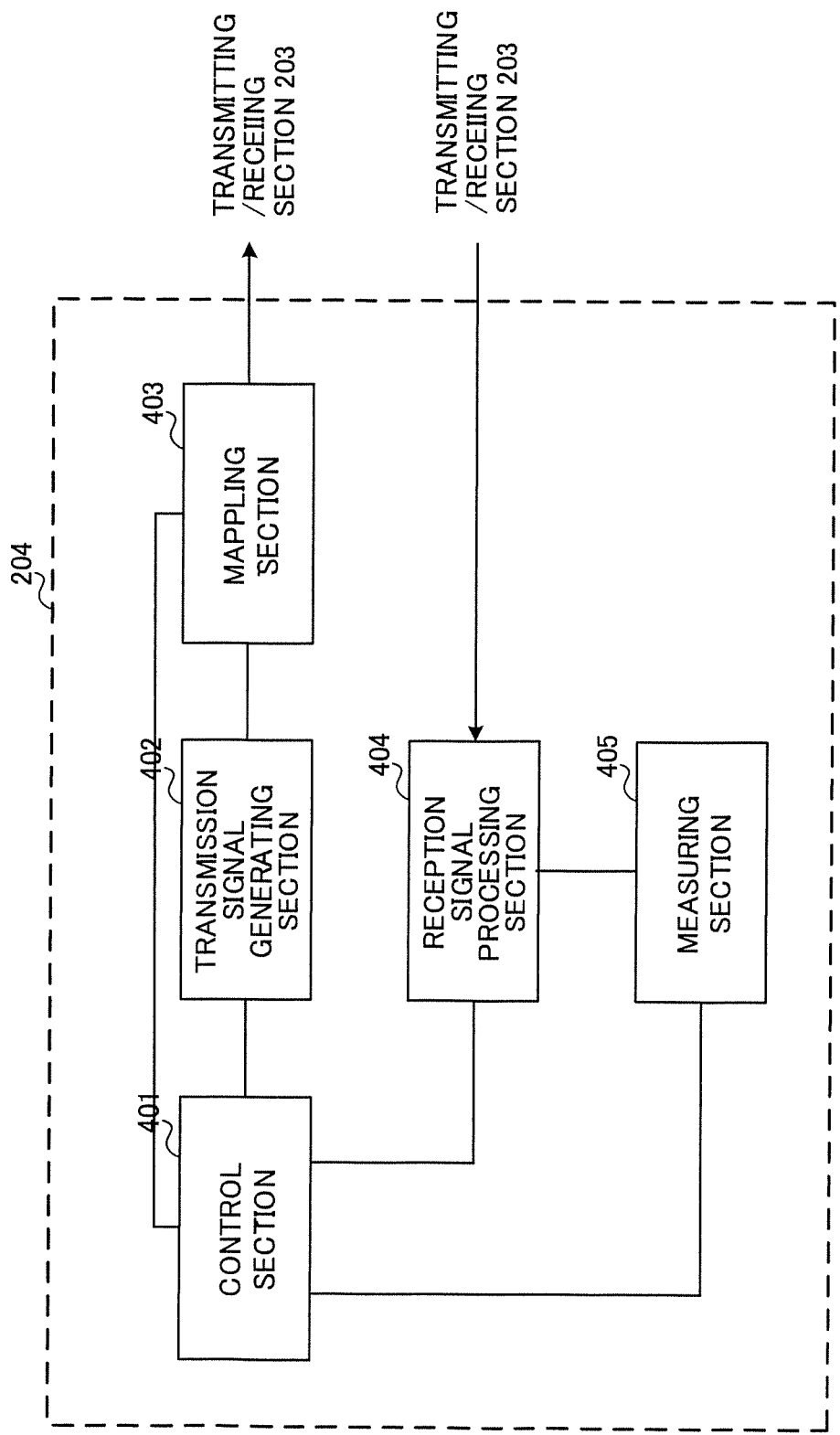
FIG. 11 is a diagram illustrating an exemplary functional configuration of the user equipment according to the present embodiment.

FIG. 11 is a diagram illustrating an exemplary functional configuration of the user equipment according to the present embodiment. FIG. 11 mainly illustrates functional blocks of feature portions in the present embodiment and the user equipment 20 also includes other functional blocks involved in wireless communication. The baseband signal processing unit 204 of the user equipment 20 includes a control unit 401, a transmission signal generation unit 402, a mapping unit 403, a received signal processing unit 404, and a decision unit 405, as illustrated in FIG. 11. The received signal processing unit 404 and the transmission and reception unit 203 may be used to implement a reception unit.

The control unit 401 obtains from the received signal processing unit 404, a downlink control signal (a signal transmitted by a PDCCH/EPDCCH) and a downlink data signal (a signal transmitted by a PDSCH) transmitted from the radio base station 10. The control unit 401 controls generation of an uplink control signal (e.g., a delivery acknowledgement signal (HARQ-ACK)) and an uplink data signal on the basis of, e.g., the result of a decision as to whether retransmission control may be performed for the downlink control signal and the downlink data signal. More specifically, the control unit 401 can control the transmission signal generation unit 402, the mapping unit 403, and the received signal processing unit 404.

The control unit 401 can control transmission (e.g., the transmission timing) of a delivery acknowledgement signal on the basis of information (e.g., an HARQ-ACK grant) concerning an instruction to transmit a delivery acknowledgement signal. The control unit 401 can further perform control to encode and transmit each of ACK/NACK signals for DL signals corresponding to an HARQ-ACK grant. Alternatively, the control unit 401 can perform control to apply ACK/NACK bundling to ACK/NACK signals for DL signals corresponding to an HARQ-ACK grant and then encode and transmit the ACK/NACK signals.

The control unit 401 can transmit ACK/NACK regardless of an HARQ-ACK grant (without an HARQ-ACK grant) when it receives no HARQ-ACK grant within a predetermined period after receiving a DL signal. The control unit 401 may be implemented as a controller, a control circuit, or a control device described on the basis of a common understanding in the technical field according to the present invention.

The transmission signal generation unit 402 generates a UL signal on the basis of an instruction from the control unit 401 and outputs it to the mapping unit 403. The transmission signal generation unit 402 generates, e.g., a delivery acknowledgement signal (HARQ-ACK) and an uplink control signal such as channel state information (CSI) on the basis of instructions from the control unit 401.

The transmission signal generation unit 402 generates an uplink data signal on the basis of an instruction from the control unit 401. When, for example, a UL grant is included in the downlink control signal notified from the radio base station 10, the transmission signal generation unit 402 is instructed to generate an uplink data signal by the control unit 401. The transmission signal generation unit 402 may be implemented as a signal generator, a signal generation circuit, or a signal generation device described on the basis of a common understanding in the technical field according to the present invention.

The mapping unit 403 maps the uplink signal (an uplink control signal and/or uplink data) generated by the transmission signal generation unit 402 to a radio resource on the basis of an instruction from the control unit 401 and outputs it to the transmission and reception unit 203. The mapping unit 403 may be implemented as a mapper, a mapping circuit, or a mapping device described on the basis of a common understanding in the technical field according to the present invention.

The received signal processing unit 404 performs reception processing (e.g., demapping, demodulation, and decoding) for DL signals (e.g., a downlink control signal transmitted from the radio base station and a downlink data signal transmitted by a PDSCH). The received signal processing unit 404 outputs information received from the radio base station 10 to the control unit 401 and the decision unit 405. The received signal processing unit 404 outputs, e.g., broadcast information, system information, RRC signaling, and DCI to the control unit 401.

The received signal processing unit 404 can perform blind decoding which assumes a downlink control signal including an HARQ-ACK grant (see FIG. 3B). Alternatively, the received signal processing unit 404 can perform blind decoding which assumes a downlink control signal including an HARQ-ACK grant and a downlink control signal including no HARQ-ACK grant (see FIG. 3C). The received signal processing unit 404 may be implemented as a set of a signal processor, a signal processing circuit, or a signal processing device and a gauge, a measurement circuit, or a measurement device described on the basis of a common understanding in the technical field according to the present invention. The received signal processing unit 404 may implement a reception unit according to the present invention.

The decision unit 405 performs a retransmission control decision (ACK/NACK) on the basis of the decoding result obtained by the received signal processing unit 404 and outputs the decision result to the control unit 401. When downlink signals (PDSCHs) are transmitted from CCs (e.g., at least six CCs), a retransmission control decision (ACK/NACK) is performed for each CC and the decision result is output to the control unit 401. The decision unit 405 may be implemented as a decision circuit or a decision device described on the basis of a common understanding in the technical field according to the present invention.

The block diagrams used to describe the above-described embodiment represent blocks of functional units. These functional blocks (constituent units) are implemented in any combination of hardware and software. The means for implementing each functional block is not particularly limited. In other words, each functional block may be implemented as one physically coupled device or implemented by at least two physically separate devices connected in a wired or wireless manner.

Some or all of respective functions of the radio base station 10 and the user equipment 20, for example, may be implemented using hardware such as an ASIC (Application Specific Integrated Circuit), a PLD (Programmable Logic Device), or an FPGA (Field Programmable Gate Array). The radio base station 10 and the user equipment 20 may be implemented as a computer apparatus including a processor (CPU: Central Processing Unit), a communication interface for network connection, a memory, and a computer-readable storage medium holding a program. In other words, a radio base station, a user equipment, and the like according to an embodiment of the present invention may serve as computers which perform the processes of a wireless communication method according to the present invention.

The processor, the memory, and the like are connected to each other via buses for information communication. Examples of the computer-readable recording medium include storage media such as a flexible disk, a magnetooptical disk, a ROM (Read Only Memory), an EPROM (Erasable Programmable ROM), a CD-ROM (Compact Disc-ROM), a RAM (Random Access Memory), and a hard disk. The program may be transmitted from a network via an electrical communication line. The radio base station 10 and the user equipment 20 may include input devices such as input keys and output devices such as displays.

The functional configuration of the radio base station 10 and the user equipment 20 may be implemented as the above-mentioned hardware, as a software module executed by the processor, or as a combination thereof. The processor controls the overall user equipment by running the operating system. The processor reads out a program, a software module, and data from the storage medium to the memory and performs various processes in accordance with them.

The program may be any program which causes the computer to execute the respective operations described in the above-described respective embodiments. The control unit 401 of the user equipment 20, for example, may be implemented as a control program stored in the memory and running on the processor, and the remaining functional blocks may be implemented similarly.

Software, instructions, and the like may be transmitted and received via transmission media. When, for example, software is transmitted from websites, servers, or other remote sources using wired technologies such as a coaxial cable, an optical fiber cable, a twisted pair, and a DSL (Digital Subscriber Line) and/or wireless technologies such as infrared, radio, and microwave technologies, these wired technologies and/or wireless technologies fall within the definition of the transmission media.

The terms described in this specification and/or the terms involved in understanding this specification may be replaced with terms having the same or similar meanings. The channels and/or symbols, for example, may be replaced with signals (signaling). The signals may be implemented as messages. The CCs (Component Carriers) may be referred to as carrier frequencies, cells, or the like.

The information, parameters, and the like described in this specification may be represented by absolute values, values relative to certain values, or other types of equivalent information. The radio resources, for example, may be indicated by indices.

The information, signals, and the like described in this specification may be represented using any of diverse techniques. Data, instructions, commands, information, signals, bits, symbols, chips, and the like that may be referred to throughout the above description, for example, may be represented by voltages, currents, electromagnetic waves, magnetic fields or particles, optical fields or photons, or any combination thereof.

The respective aspects/embodiments described in this specification may be used solely, used in combination, or switchably used upon execution. The notification of predetermined information (e.g., the notification of "X") is not limited to explicit notification, and may be done implicitly (e.g., without notification of the predetermined information).

The information notification is not limited to the aspects/embodiments described in this specification and may be done using other methods. The information notification may be done by, e.g., physical layer signaling (e.g., DCI (Downlink Control Information) and UCI (Uplink Control Information)), upper layer signaling (e.g., RRC (Radio Resource Control) signaling, MAC (Medium Access Control) signaling, and broadcast information (an MIB (Master Information Block) and an SIB (System Information Block))), other signals, or any combination thereof. The RRC signaling may also be referred to as RRC messages, which may include, e.g., RRC connection setup (RRCConnectionSetup) messages and RRC connection reconfiguration (RRCConnectionReconfiguration) messages.

The aspects/embodiments described in this specification may be applied to systems which utilize LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (Wi-MAX), IEEE 802.20, UWB (Ultra-WideBand), Bluetooth®, and systems using other types of appropriate systems, and/or next-generation systems extended on the basis of these systems.

The processing procedures, sequences, flowcharts, and the like of the aspects/embodiments described in this specification may be executed in different orders as long as consistency can be ensured. The method described in this specification, for example, presents elements of various steps in an exemplary order, and is not limited to the presented specific order.

Although the present invention has been described in detail above, it will be apparent for those skilled in the art that the present invention is not limited to the embodiments described in this specification. The present invention can be carried out as modifications and changed aspects without departing from the spirit and scope of the present invention defined by the description of the scope of claims. The description of the present invention is for illustrative purpose and is not intended to limit the present invention in any way.

This application is based on Japanese Patent Application No. 2015-164186 filed on Aug. 21, 2015, the contents of which are incorporated herein in their entirety.

The invention claimed is:

1. A terminal comprising:
a receiver that receives a first downlink control information (DCI) for scheduling a physical downlink shared channel (PDSCH); and
a processor that controls transmission of a Hybrid Automatic Repeat request Acknowledgement (HARQ-ACK) for the PDSCH scheduled by the first DCI based on information related to a transmission instruction of the HARQ-ACK included in a second DCI subsequent to the first DCI,
wherein the receiver receives, in the second DCI, information concerning a resource for transmitting the HARQ-ACK and information concerning a signal sequence of an uplink channel for transmitting the HARQ-ACK.

2. The terminal according to claim 1, wherein the receiver performs decoding assuming a DCI that includes the information related to the transmission instruction of the HARQ-ACK and a DCI that does not include the information related to the transmission instruction of the HARQ-ACK.

3. The terminal according to claim 1, wherein the processor controls to encode and transmit each of the HARQ-ACKs for the PDSCHs corresponding to the information related to the transmission instruction of the HARQ-ACK.

4. The terminal according to claim 2, wherein the processor controls to encode and transmit each of the HARQ-ACKs for the PDSCHs corresponding to the information related to the transmission instruction of the HARQ-ACK.

5. A base station comprising:
a transmitter that transmits a first downlink control information (DCI) for scheduling a physical downlink shared channel (PDSCH); and
a processor that controls reception of a Hybrid Automatic Repeat request Acknowledgement (HARQ-ACK) for the PDSCH scheduled by the first DCI transmitted based on information related to a transmission instruction of the HARQ-ACK,
wherein the information related to the transmission instruction of the HARQ-ACK is included in a second DCI subsequent to the first DCI, and
wherein the transmitter transmits, in the second DCI, information concerning a resource for transmitting the HARQ-ACK and information concerning a signal sequence of an uplink channel for transmitting the HARQ-ACK.

6. A radio communication method for a terminal, comprising:
receiving a first downlink control information (DCI) for scheduling a physical downlink shared channel (PDSCH); and
controlling transmission of a Hybrid Automatic Repeat request Acknowledgement (HARQ-ACK) for the PDSCH scheduled by the first DCI based on information related to a transmission instruction of the HARQ-ACK included in a second DCI subsequent to the first DCI,
wherein, in the second DCI, information concerning a resource for transmitting the HARQ-ACK and information concerning a signal sequence of an uplink channel for transmitting the HARQ-ACK is received.

* * * * *